United States Patent
Kim et al.

(10) Patent No.: US 12,253,855 B2
(45) Date of Patent: *Mar. 18, 2025

(54) METHOD AND APPARATUS FOR HANDLING GOODS BY UNMANNED AERIAL VEHICLE AND AUTONOMOUS VEHICLE

(71) Applicants: PABLO AIR Co., Ltd., Incheon (KR); PABLO AIR International, INC., Phoenix, AZ (US)

(72) Inventors: Youngjoon Kim, Incheon (KR); Seung Han Lim, Daejeon (KR)

(73) Assignees: PABLO AIR Co., Ltd., Incheon (KR); PABLO AIR International, INC., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/364,541

(22) Filed: Aug. 3, 2023

(65) Prior Publication Data
US 2023/0376038 A1    Nov. 23, 2023

Related U.S. Application Data

(63) Continuation of application No. 17/721,597, filed on Apr. 15, 2022, now Pat. No. 11,768,491, which is a (Continued)

(30) Foreign Application Priority Data

Jan. 21, 2021   (KR) .................. 10-2021-0008448

(51) Int. Cl.
*G05D 1/00*      (2024.01)
*B64D 1/12*      (2006.01)
(Continued)

(52) U.S. Cl.
CPC ............ *G05D 1/0094* (2013.01); *B64D 1/12* (2013.01); *B64D 1/22* (2013.01); *G05D 1/0276* (2013.01);
(Continued)

(58) Field of Classification Search
CPC .... G05D 1/0094; G05D 1/0276; G05D 1/101; G05D 1/102; B64C 39/024; B64D 1/12;
(Continued)

(56) References Cited

U.S. PATENT DOCUMENTS 9,387,928 B1 *  7/2016  Gentry .................. G05D 1/102
9,434,267 B2    9/2016  Wang et al.
(Continued)

FOREIGN PATENT DOCUMENTS

KR   10-2015-0104863 A    9/2015
KR   10-2017-0050890 A    5/2017
(Continued)

OTHER PUBLICATIONS

A Notice of Allowance mailed by the Korean Intellectual Property Office on Dec. 22, 2022, which corresponds to Korean Patent Application No. 10-2021-0156397 and is related to U.S. Appl. No. 17/721,597.

*Primary Examiner* — Frederick M Brushaber
(74) *Attorney, Agent, or Firm* — Studebaker Brackett PLLC

(57) ABSTRACT

Provided is a method for an unmanned aerial vehicle to handle goods in cooperation with an autonomous vehicle. The method performed by the unmanned aerial vehicle includes at least: capturing an image of the autonomous vehicle having a goods storage box; recognizing a marker displayed in the goods storage box by analyzing the captured image; identifying a region occupied by the marker on the captured image; adjusting a relative position of the
(Continued)

unmanned aerial vehicle and the autonomous vehicle. The marker displayed in the goods storage box is covered by a lid of the goods storage box and placed in a state that cannot be captured by the unmanned aerial vehicle. The marker is exposed in a state that can be captured by the unmanned aerial vehicle only when the lid of the storage box is opened by communication between the unmanned aerial vehicle and the autonomous vehicle.

6 Claims, 15 Drawing Sheets

Related U.S. Application Data continuation of application No. 17/518,967, filed on Nov. 4, 2021, now Pat. No. 11,334,078.

(51) Int. Cl.
| | | |
|---|---|---|
| *B64D 1/22* | (2006.01) | |
| *G06K 7/10* | (2006.01) | |
| *G06K 7/14* | (2006.01) | |
| *G06V 20/17* | (2022.01) | |
| *B64U 10/16* | (2023.01) | |
| *B64U 20/87* | (2023.01) | |
| *B64U 101/30* | (2023.01) | |
| *B64U 101/60* | (2023.01) | |
| *H04W 76/10* | (2018.01) | |

(52) U.S. Cl.
CPC ......... *G05D 1/101* (2013.01); *G06K 7/10722* (2013.01); *G06K 7/1417* (2013.01); *G06V 20/17* (2022.01); *B64U 10/16* (2023.01); *B64U 20/87* (2023.01); *B64U 2101/30* (2023.01); *B64U 2101/60* (2023.01); *H04W 76/10* (2018.02)

(58) Field of Classification Search
CPC . B64D 1/22; B64D 47/08; B64D 1/10; B64D 1/02; G06K 7/10722; G06K 7/1417; G06K 7/10; G06V 20/17; G06V 20/54; B64U 10/13; B64U 50/00; B64U 2101/30; B64U 2101/60; B64U 10/16; B64U 20/87; B64U 2201/10; H04W 76/10; B25J 13/006; B25J 9/0009; G06Q 10/08

See application file for complete search history.

(56) References Cited

U.S. PATENT DOCUMENTS

| | | | |
|---|---|---|---|
| 9,527,605 B1* | 12/2016 | Gentry | G05D 1/0094 |
| 9,817,396 B1* | 11/2017 | Takayama | G08G 5/025 |
| 9,975,651 B1 | 5/2018 | Eck et al. | |
| 10,112,712 B1* | 10/2018 | Gentry | G08G 5/0069 |
| 10,611,252 B2 | 4/2020 | Wang et al. | |
| 11,081,013 B1* | 8/2021 | Harris | B64D 1/02 |
| 11,172,776 B1* | 11/2021 | Logan | G08B 13/14 |
| 11,691,756 B1* | 7/2023 | Ludington | G06K 7/1408 |
| | | | 701/16 |
| 2010/0193626 A1* | 8/2010 | Goossen | B64U 80/10 |
| | | | 244/2 |
| 2015/0183528 A1* | 7/2015 | Walsh | A47G 29/14 |
| | | | 244/114 R |
| 2016/0207637 A1* | 7/2016 | Campillo | B64U 80/25 |
| 2016/0339789 A1 | 11/2016 | Wang et al. | |
| 2016/0376031 A1* | 12/2016 | Michalski | G05D 1/652 |
| | | | 701/15 |
| 2017/0213062 A1 | 7/2017 | Jones et al. | |
| 2017/0221246 A1* | 8/2017 | Zhong | H04N 5/45 |
| 2019/0043000 A1* | 2/2019 | Wang | B60L 53/30 |
| 2020/0230822 A1* | 7/2020 | Sohmshetty | B25J 5/06 |
| 2021/0022536 A1* | 1/2021 | Anderson | G06Q 10/0832 |

FOREIGN PATENT DOCUMENTS

| | | |
|---|---|---|
| KR | 10-2017-0074369 A | 6/2017 |
| KR | 10-2017-0138663 A | 12/2017 |
| KR | 10-1805440 B1 | 12/2017 |
| KR | 10-2020-0044691 A | 4/2020 |

* cited by examiner

METHOD AND APPARATUS FOR HANDLING GOODS BY UNMANNED AERIAL VEHICLE AND AUTONOMOUS VEHICLE

CROSS-REFERENCE TO RELATED APPLICATIONS

This application is a Continuation of U.S. patent application Ser. No. 17/721,597 filed Apr. 15, 2022, which is a Continuation of U.S. patent application Ser. No. 17/518,967 filed Nov. 4, 2021, which claims the benefit of Korean Patent Application No. 10-2021-0008448, filed on Jan. 21, 2021, in the Korean Intellectual Property Office, the disclosure of which is incorporated herein by reference in its entirety.

BACKGROUND

1. Field

The present disclosure relates to a method for handing goods using an unmanned aerial vehicle and an autonomous vehicle. More particularly, it relates to a method for handing over delivery target goods to a storage box of an autonomous vehicle such as an autonomous driving robot and an autonomous driving vehicle using an unmanned aerial vehicle, and an apparatus therefor.

2. Description of the Related Art

Today, unmanned aerial vehicles such as drones are being used in various fields. For example, unmanned aerial vehicles are being used in the broadcasting field, agriculture field, military field, and the like.

Furthermore, a technology for delivering goods using an unmanned aerial vehicle is currently being developed. That is, research is being conducted on a service that delivers goods to a designated place in a state in which the unmanned aerial vehicle grips the goods. Using such an unmanned aerial vehicle for delivery not only saves labor costs, but also enables rapid delivery of goods to areas where vehicles are difficult to move, such as mountainous areas and islands.

However, in the case of delivering goods through an unmanned aerial vehicle, there is a need for the goods to be accurately unloaded at a designated location. For example, in order to store goods in a designated goods storage box, the unmanned aerial vehicle should accurately unload the goods into the goods storage box. If the goods are not accurately unloaded into the goods storage box and the goods are unloaded around the goods storage box, the reliability of the delivery of the goods is lowered, and the goods may be lost or damaged due to rain and wind, and external factors.

SUMMARY

The technical problem to be solved by the present disclosure is to provide a method for handling goods using an unmanned aerial vehicle that accurately unloads goods to a designated location by adjusting the positions of an autonomous vehicle having a storage box and an unmanned aerial vehicle, and an apparatus therefor.

Another technical problem to be solved by the present disclosure is to provide a method for handling goods using an unmanned aerial vehicle that precisely adjusts the position of the unmanned aerial vehicle when unloading through image analysis, and an apparatus therefor.

Another technical problem to be solved by the present disclosure is to provide an autonomous vehicle that guides the unmanned aerial vehicle to accurately unload goods, and delivers the unloaded goods to a designated position.

The technical problems of the present disclosure are not limited to the technical problems mentioned above, and other technical problems not mentioned will be clearly understood by those skilled in the art from the following description.

According to an embodiment, a method for an unmanned aerial vehicle to handle goods in cooperation with an autonomous vehicle may include capturing, by the unmanned aerial vehicle, an image of the autonomous vehicle having a storage box for storing goods, recognizing, by the unmanned aerial vehicle, a marker displayed in the storage box by analyzing the captured image, identifying, by the unmanned aerial vehicle, a region occupied by the marker on the captured image, calculating, by the unmanned aerial vehicle, a distance between center coordinates of the identified region and center coordinates of the image, adjusting a relative position of the unmanned aerial vehicle and the autonomous vehicle based on the calculated distance exceeding a threshold distance, determining, by the unmanned aerial vehicle, a handling attribute of the goods based on delivery information associated with the goods, based on a determination that the goods had a first handling attribute, unwinding a wire connected to a gripping member gripping the goods to lower the gripping member into the storage box while the unmanned aerial vehicle is hovering, and releasing a gripping state of the goods when the lowering of the gripping member is completed; and based on a determination that the goods has a second handling attribute, releasing a gripping state of the goods in air above the storage box while the unmanned aerial vehicle is hovering, wherein the marker displayed in the storage box is covered by a lid of the storage box and placed in a state that is invisible to the unmanned aerial vehicle, and the marker is exposed in a state that is visible to the unmanned aerial vehicle only when the lid of the storage box is opened by communication between the unmanned aerial vehicle and the autonomous vehicle.

According to an embodiment, wherein the adjusting may include moving the unmanned aerial vehicle towards a center of the region to adjust the relative position with the autonomous vehicle when the calculated distance exceeds the threshold distance.

According to an embodiment, wherein capturing the image may include establishing, by the unmanned aerial vehicle, a short-range wireless session with the autonomous vehicle, transmitting, by the unmanned aerial vehicle, an first signal for opening the lid of the goods storage box to the autonomous vehicle through the short-range wireless session, and capturing, by the unmanned aerial vehicle, an image of the autonomous vehicle wherein the lid of the storage box is opened to expose the marker in response to the first signal.

According to another embodiment, an unmanned aerial vehicle may include a thrust generating unit for generating a thrust to move an unmanned aerial vehicle to an autonomous vehicle having a storage box, a gripping member for gripping goods, a camera for capturing the autonomous vehicle, and a control unit for recognizing a marker displayed in the storage box by analyzing the captured image, controlling the thrust generating unit to adjust a relative position of the autonomous vehicle and the unmanned aerial vehicle based on a recognition state of the marker, and releasing a gripping state of the gripping member to unload the goods into the storage box when position adjustment is completed, wherein the control unit calculates a distance between center coordinates of a region occupied by the marker in the captured image and center coordinates of the image, determines that the position adjustment is completed when the calculated distance is within a threshold distance, and controls the thrust generating unit so that the relative position of the autonomous vehicle and the unmanned aerial vehicle is adjusted when the calculated distance exceeds the threshold distance, wherein the marker displayed in the storage box is covered by a lid of the storage box and placed in a state that is invisible to the unmanned aerial vehicle, and the marker is exposed in a state that is visible to the unmanned aerial vehicle only when the lid of the storage box is opened by communication between the unmanned aerial vehicle and the autonomous vehicle.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, embodiments of the present disclosure will be described with reference to the attached drawings. Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

Hereinafter, some embodiments of the present disclosure will be described in detail with reference to the accompanying drawings.

Figure 1:
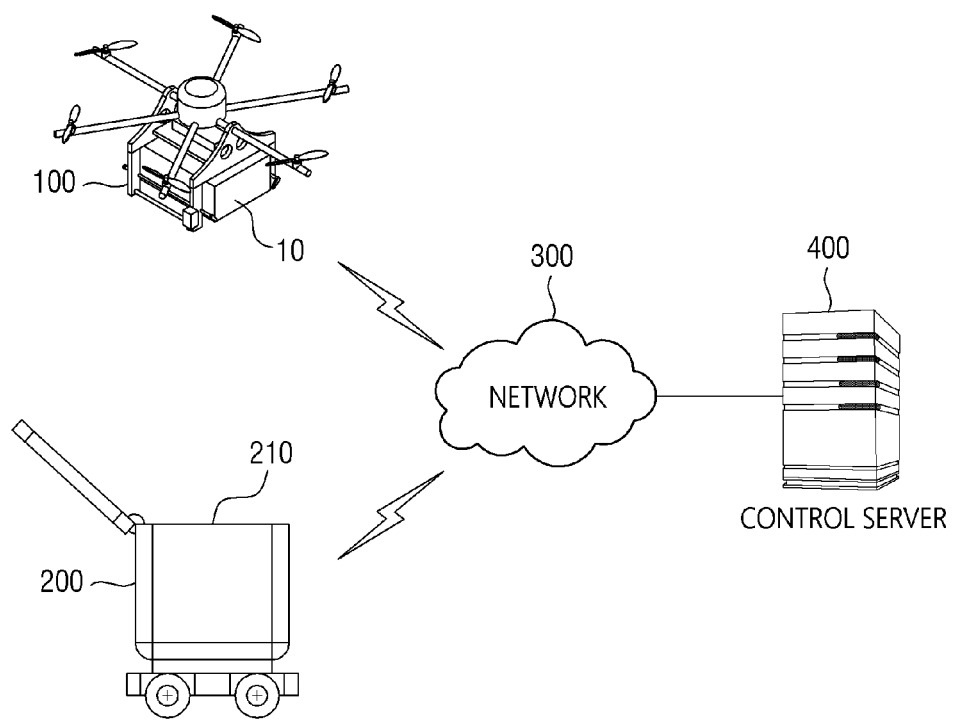
FIG. 1 is a diagram showing the configuration of a delivery system according to an embodiment of the present disclosure.

FIG. 1 is a diagram showing the configuration of a delivery system according to an embodiment of the present disclosure.

As shown in FIG. 1, the delivery system according to an embodiment of the present disclosure may include an unmanned aerial vehicle 100, an autonomous vehicle 200, and a control server 400, and each of these components can communicate with each other through network 300. The network 300 includes a mobile communication network and a wired communication network, and may support communication between the unmanned aerial vehicle 100 or the autonomous vehicle 200 and the control server 400.

The control server 400 is a server that controls the unmanned aerial vehicle 100 that delivers the goods 10, and may provide delivery information including unloading places, delivery destination information, and information on whether the goods 10 correspond to fragile to the unmanned aerial vehicle 100. In addition, the control server 400 may receive the position information from the unmanned aerial vehicle 100, and monitor whether the unmanned aerial vehicle 100 is moving in a designated route. In some embodiments, the control server 400 may select an autonomous vehicle 200 in charge of delivery of goods on the ground from among a plurality of autonomous vehicles, and transmit identification information of the selected autonomous vehicle 200 to the unmanned aerial vehicle 100 to allow the unmanned aerial vehicle 100 to identify the autonomous vehicle 200, to which the goods should be handed over.

The unmanned aerial vehicle 100 is a flying device that automatically delivers the goods 10 to a designated unloading place, has one or more thrust generating means such as a propeller, and can fly in the air using the thrust generating means. The unmanned aerial vehicle 100 is provided with gripping members 112 and 113 capable of gripping the goods 10 as shown in FIGS. 2 to 7, and can be flied to the unloading place in a state of gripping the goods 10 using the gripping members 112 and 113. When the unmanned aerial vehicle 100 moves to the unloading place, the goods 10 can be unloaded into the goods storage box 210 equipped by the autonomous vehicle 200. In one embodiment, the unmanned aerial vehicle 100 may adjust the relative position with the autonomous vehicle 200 based on the recognition state of a marker (refer to 213 in FIG. 14) displayed in the goods storage box 210. The unmanned aerial vehicle 100 may align its position to the unloading position based on the recognition state of the marker, and then unload the goods 10 being gripped into the goods storage box 210 equipped by the autonomous vehicle 200. A known technology may be used as the autonomous flight method of the unmanned aerial vehicle 100.

The autonomous vehicle 200 is a device capable of autonomously moving to a designated delivery position using driving means such as wheels or walking means such as legs, and includes an autonomous driving vehicle and an autonomous driving robot. The autonomous vehicle 200 includes a goods storage box 210, into which the goods 10 is unloaded. The lid of the goods storage box 210 can be opened and closed, and the autonomous vehicle 200 can open or close the lid of the goods storage box 210. In an embodiment, when the autonomous vehicle 200 is capable of short-range wireless communication with the unmanned aerial vehicle 100, it may control to open the lid, and then control to close the lid when the goods are unloaded into the goods storage box 210. A known autonomous driving technology may be adopted and used in the autonomous vehicle 200.

According to this embodiment, the unmanned aerial vehicle 100 moves to the unloading place in a state of gripping the goods 10, and then unloads the goods 10 into the goods storage box 210 of the autonomous vehicle 200 waiting at the unloading place. The autonomous vehicle 200 storing the goods 10 may autonomously drive to a delivery destination to deliver the goods to a recipient.

According to the present embodiment, position alignment for unloading of the unmanned aerial vehicle 100 and the autonomous vehicle 200 is performed based on the marker recognition, so that the effect of accurately and safely unloading the goods 10 into the goods storage box 210 is yielded.

The configuration and operation of the unmanned aerial vehicle 100 applied to the delivery system will be described.

Figure 2:
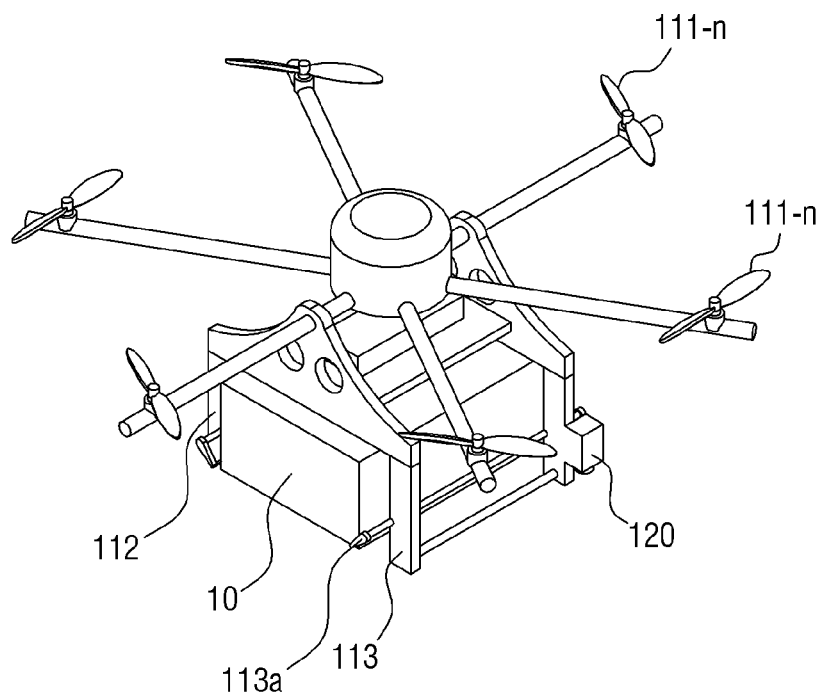
FIGS. 2 and 3 are perspective views of an unmanned aerial vehicle according to an embodiment of the present disclosure.
Figure 3:
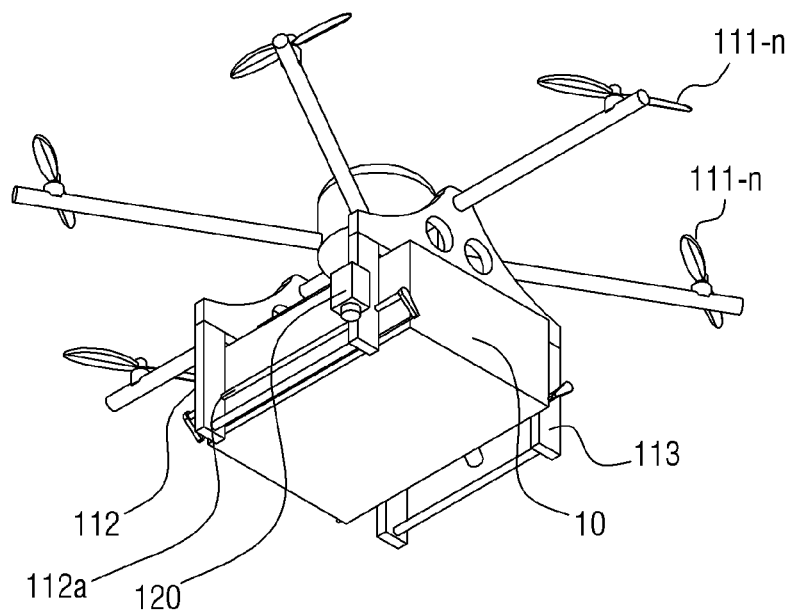

FIGS. 2 and 3 are perspective views of an unmanned aerial vehicle according to an embodiment of the present disclosure.

Figure 4:
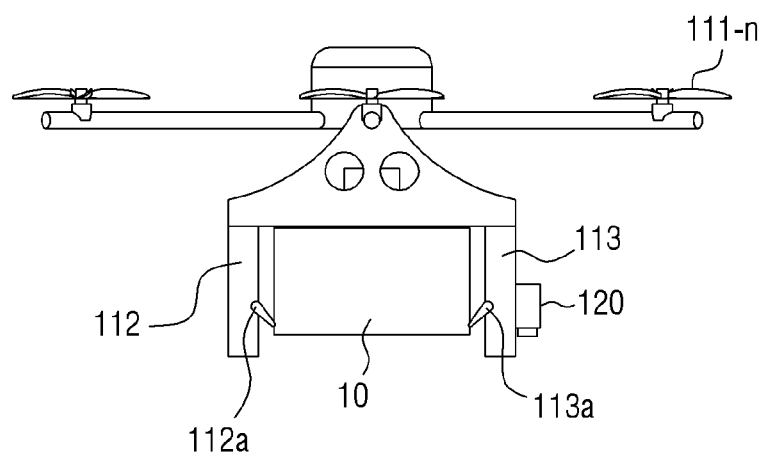
FIG. 4 is a front view of an unmanned aerial vehicle according to an embodiment of the present disclosure.

FIG. 4 is a front view of an unmanned aerial vehicle according to an embodiment of the present disclosure.

Figure 5:
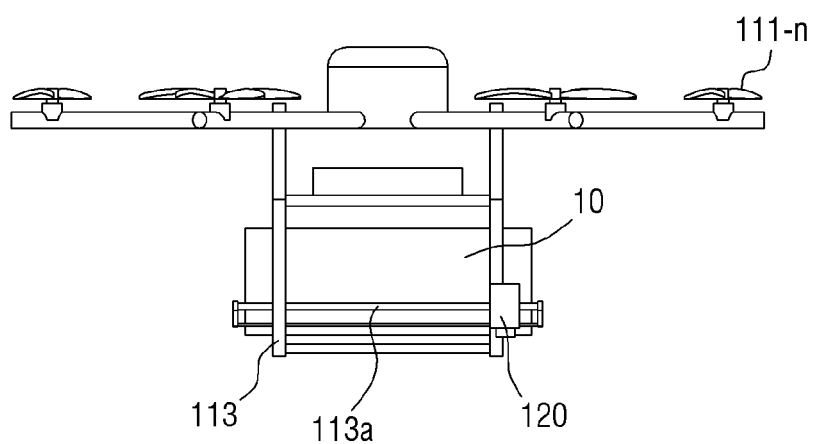
FIG. 5 is a side view of an unmanned aerial vehicle according to an embodiment of the present disclosure.

FIG. 5 is a side view of an unmanned aerial vehicle according to an embodiment of the present disclosure.

Referring to FIGS. 2 to 5, the unmanned aerial vehicle 100 according to an embodiment of the present disclosure includes a plurality of propellers 111-$n$ as a means for generating an output power, a camera 120 for capturing an image of an autonomous vehicle 200, and a gripping members 112 and 113 for gripping the goods.

The plurality of propellers 111-$n$ are rotated according to the control to levitate the unmanned aerial vehicle 100 in the air.

The camera 120 may be disposed on the unmanned aerial vehicle 100 at a position capable of capturing a downward direction. In a state, in which the center point of the goods 10 gripped by the unmanned aerial vehicle 100 and the center point of the bottom surface of the goods storage box 210 coincide in the vertical direction, at least one of a position of the camera 120, a capturing angle, and a position of the marker may be adjusted so that the center coordinates of the entire image captured by the camera 120 and the center coordinates of the region occupied by the marker in the image coincide. For example, as in FIGS. 2 to 7, when the camera 120 is not installed at the center position of the goods 10, in a state, in which the center point of the goods 10 and the center point of the bottom surface of the goods storage box 210 coincide in the vertical direction, the capturing angle of the camera 120 or the position of the marker may be set so that the center coordinates of the entire image captured by the camera 120 and the center coordinates of the region occupied by the marker in the image coincide. In another embodiment, the camera 120 may be disposed on the unmanned aerial vehicle 100 so that it is located at the exact center of the goods 10, and the marker may be located at the center of the bottom surface of the goods storage box 210 in correspondence with the camera position.

The gripping members 112, 113 grip and lower the goods 10. As shown in FIGS. 2 to 7, the gripping members 112 and 113 are symmetrically formed on both sides, and an internal space capable of accommodating the goods 10 may be provided therein. In addition, the inner surfaces of the gripping members 112 and 123 may include pressing members 112$a$ and 113$a$ for pressing and gripping the goods 10 with a constant force. As shown in FIG. 5, the pressing members 112$a$ and 113$a$ may have a predetermined length.

The pressing members 112$a$ and 113$a$ press the goods 10 toward the inner surface when gripping the goods, and move to the outer surface to release the pressing force to be applied in the direction of the goods 10 when releasing the grip of the goods 10 and unloading them.

Figure 6:
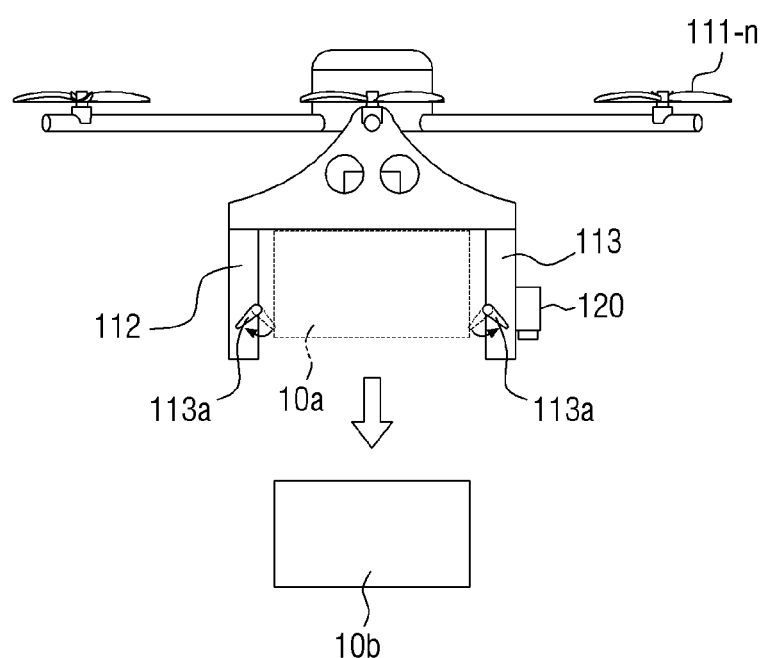
FIG. 6 is a view illustrating a state, in which the unmanned aerial vehicle releases the gripping of goods, according to an embodiment of the present disclosure.

FIG. 6 is a view illustrating a state, in which the unmanned aerial vehicle according to an embodiment of the present disclosure releases the gripping of the goods.

As illustrated in FIG. 6, when the pressing members 112$a$ and 113$a$ move to the outer surface, the gripping state of the goods 60$a$ is released, so that the goods 60$b$ falls downward.

Meanwhile, the gripping members 112 and 113 may be lowered in a state of gripping the goods.

Figure 7:
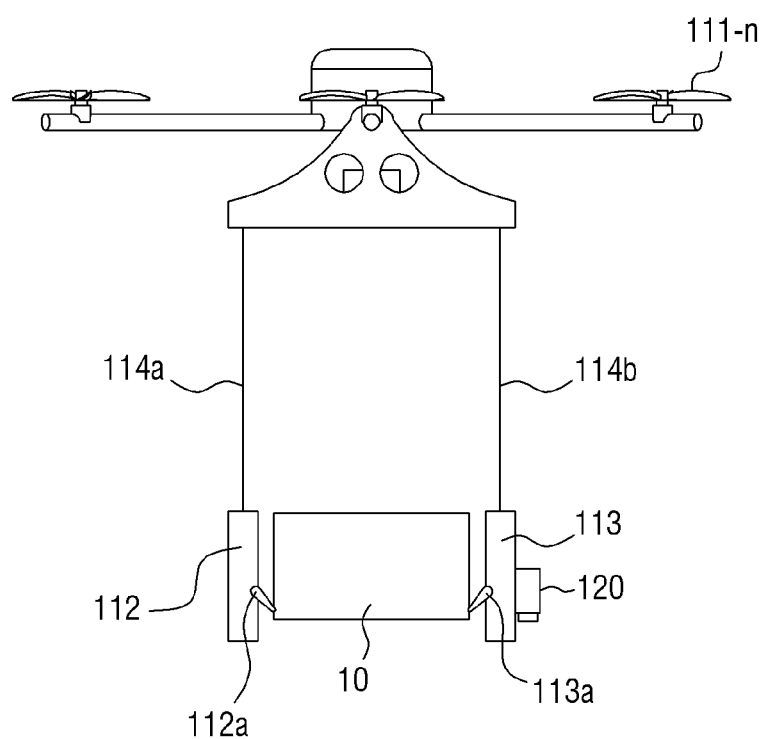
FIG. 7 is a view illustrating that the unmanned aerial vehicle lowers goods.

FIG. 7 is a view illustrating that the unmanned aerial vehicle lowers the goods.

As illustrated in FIG. 7, wires 114$a$ and 114$b$ may be connected to the upper portions of the gripping members 112 and 113. One end of the wires 114$a$ and 114$b$ may be connected to a winding means (not shown in figures), and the other end may be connected to the upper portions of the gripping members 112 and 113. When the wires 114$a$ and 114$b$ are unwound, it is lowered in a state, in which the goods 10 is gripped, as shown in FIG. 7. In addition, when the wire 114$a$, 114$b$ is wound, the gripping member 112, 113 is raised again, and it can be closely coupled to the body of the unmanned aerial vehicle 100.

In this embodiment, the gripping members 112 and 113 have been described as an example, but the present disclosure is not limited thereto, and various types of gripping means capable of gripping the goods 10 may be applied and used in the present disclosure.

Figure 8:
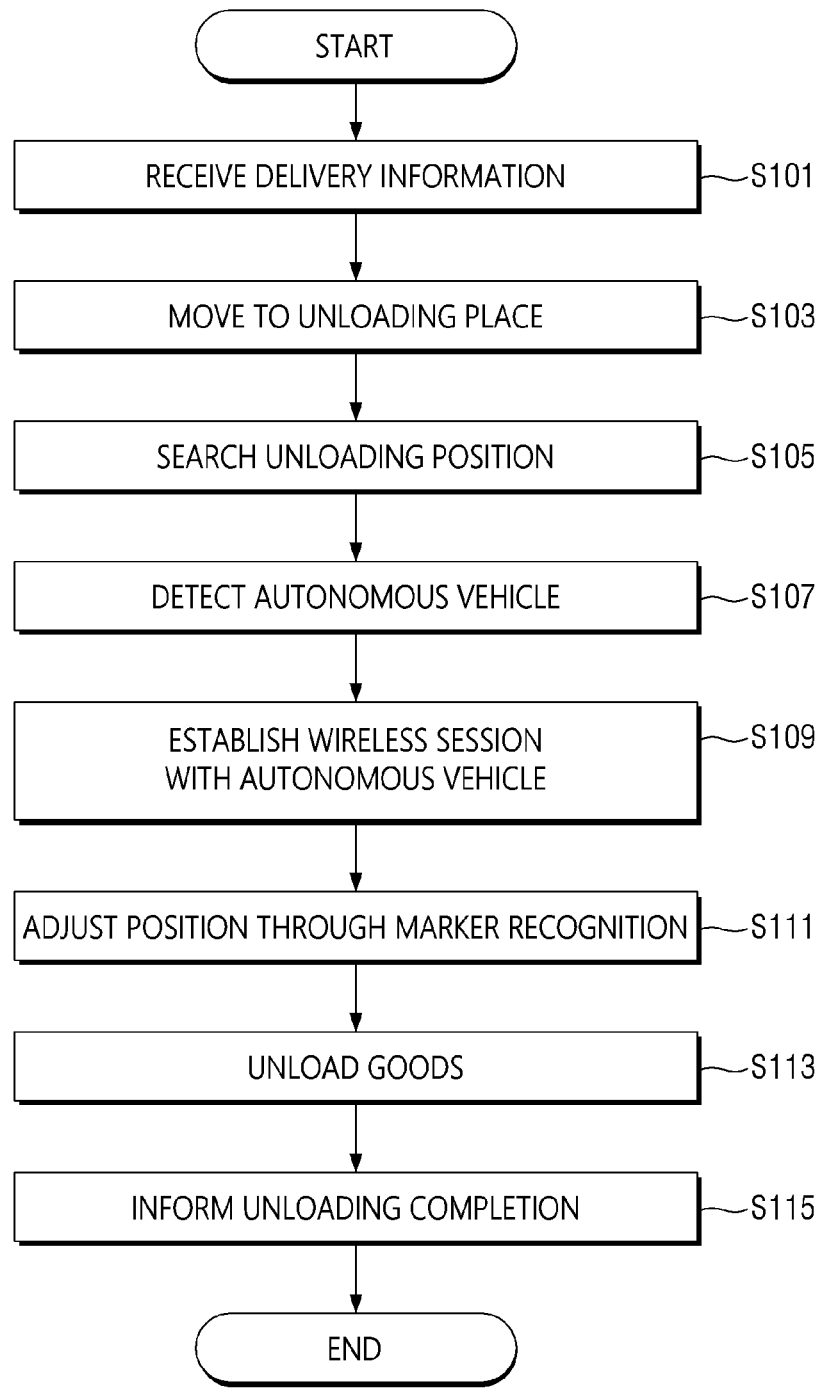
FIG. 8 is a flowchart illustrating a method of handling goods using an unmanned aerial vehicle according to another embodiment of the present disclosure.

FIG. 8 is a flowchart illustrating a method of handling delivery target goods using an unmanned aerial vehicle according to another embodiment of the present disclosure.

Referring to FIG. 8, the unmanned aerial vehicle 100 may receive and store delivery information from the control server 400 through the network 300 (S101). The delivery information may include an unloading place, delivery destination information, identification information of an autonomous vehicle in charge of delivery of goods on the ground, and handling attributes of the goods. The handling attribute of the goods may include information indicating whether the goods correspond to fragile. For example, when the handling attribute is the first attribute, the goods may correspond to fragile, and when the handling attribute is the second attribute, the article may not correspond to fragile.

Next, the unmanned aerial vehicle 100 may autonomously fly and move to the unloading place (S103). When the unmanned aerial vehicle 100 arrives at the unloading place, it searches whether the autonomous vehicle 200 is located at the unloading place (S105). At this time, the unmanned aerial vehicle 100 may search for the autonomous vehicle 200 through image recognition using the camera 120, or search for the autonomous vehicle 200 through determination on whether identification information of the autonomous vehicle 200 is received through short-range wireless communication.

When the unmanned aerial vehicle 100 detects the autonomous vehicle 200 (S107), it may establish a short-range wireless session with the autonomous vehicle 200 (S109). In one embodiment, the unmanned aerial vehicle 100 may form a short-range wireless session with the autonomous vehicle 200 having the identification information in response to detecting the identification information of the autonomous vehicle 200 included in the delivery information. Subsequently, the unmanned aerial vehicle 100 may transmit various data required for goods delivery to the autonomous vehicle 200, with which a short-range wireless session is formed. For example, the unmanned aerial vehicle 100 may acquire delivery destination information from stored delivery information, and transmit the delivery destination information to the autonomous diving mobile object 200. In one embodiment, the marker displayed in the goods storage box 210 is covered by the lid of the goods storage box 210 and is placed in a state that is invisible to and cannot be captured by the unmanned aerial vehicle 100, and can be exposed in a state that is visible to and can be captured by the unmanned aerial vehicle 100 only when the lid of the goods storage box 210 is opened by communication between the unmanned aerial vehicle 100 and the autonomous vehicle 200.

Next, the unmanned aerial vehicle 100 analyzes the image captured through the camera 120, recognizes the marker displayed in the goods storage box 210, and then, may adjust the relative position with the autonomous vehicle 200 based on the recognition state of the marker (S111). A method of adjusting the position based on the recognized marker will be described in detail with reference to FIG. 9.

Next, when the position adjustment is completed, the unmanned aerial vehicle 100 may perform flight in place (i.e., hovering) at the current position, and unload the goods into the goods storage box 210 of the autonomous vehicle 200 (S113). The goods unloading method will be described in detail with reference to FIG. 10.

When the unloading of goods is completed, the unmanned aerial vehicle 100 may transmit an unloading completion message to the control server 400 (S115).

Figure 9:
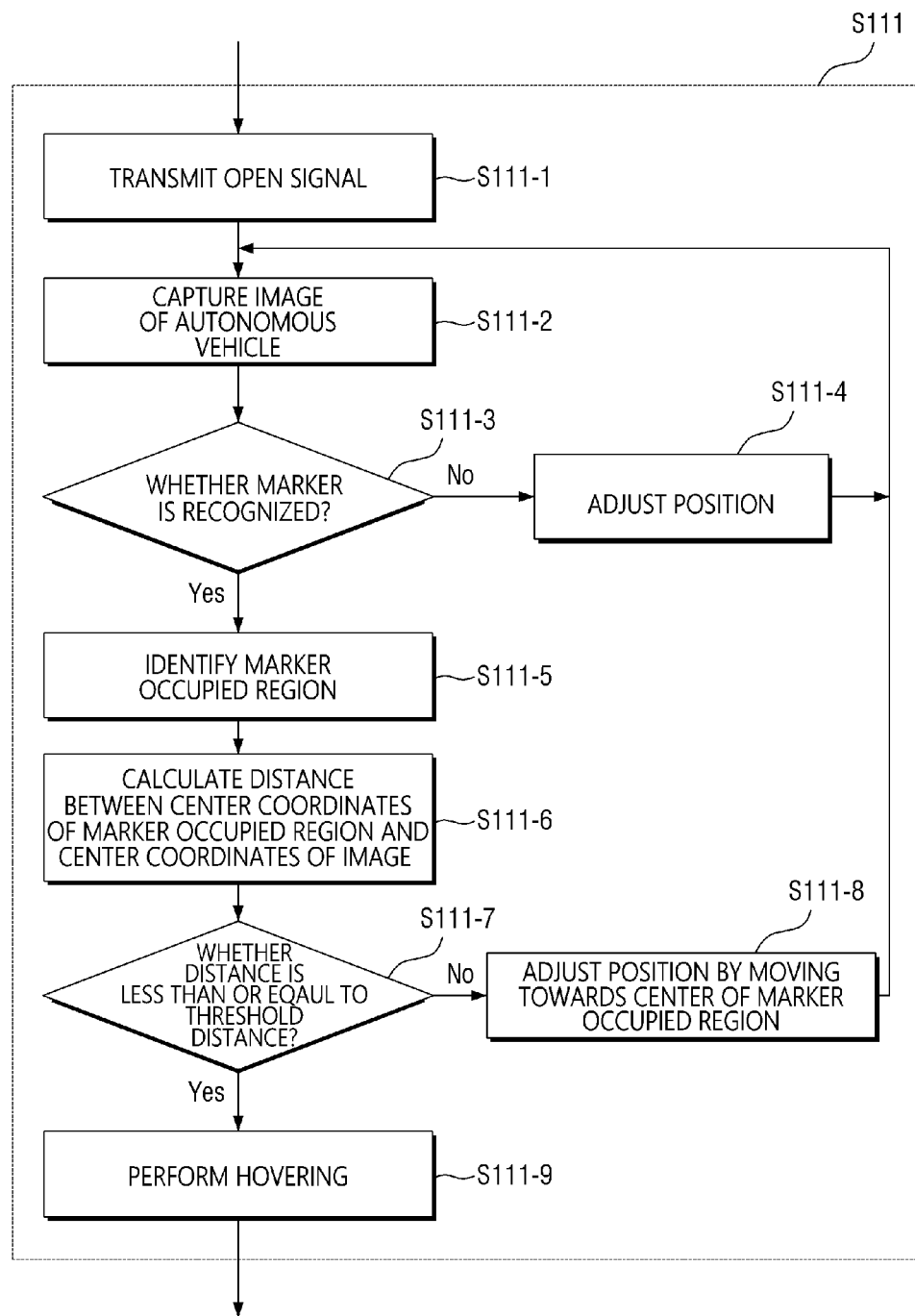
FIG. 9 is a flowchart for describing in more detail some operations of the goods handling method that may be understood with reference to FIG. 8.

Hereinafter, a method of adjusting a position through marker recognition (S111) will be described in more detail with reference to FIG. 9.

When the unmanned aerial vehicle 100 forms a short-range wireless session with the autonomous driving mobile objet 200, it may transmit an open signal instructing to open the lid of the goods storage box 210 to the autonomous vehicle 200 (S111-1). Accordingly, the marker displayed in the goods storage box 210 is covered by the lid of the goods storage box 210 and is placed in a state that is invisible to and cannot be captured by the unmanned aerial vehicle 100, and can be exposed in a state that is visible to and can be captured by the unmanned aerial vehicle 100 only when the lid of the storage box 210 is opened by communication between the unmanned aerial vehicle 100 and the autonomous vehicle 200.

Figure 14:
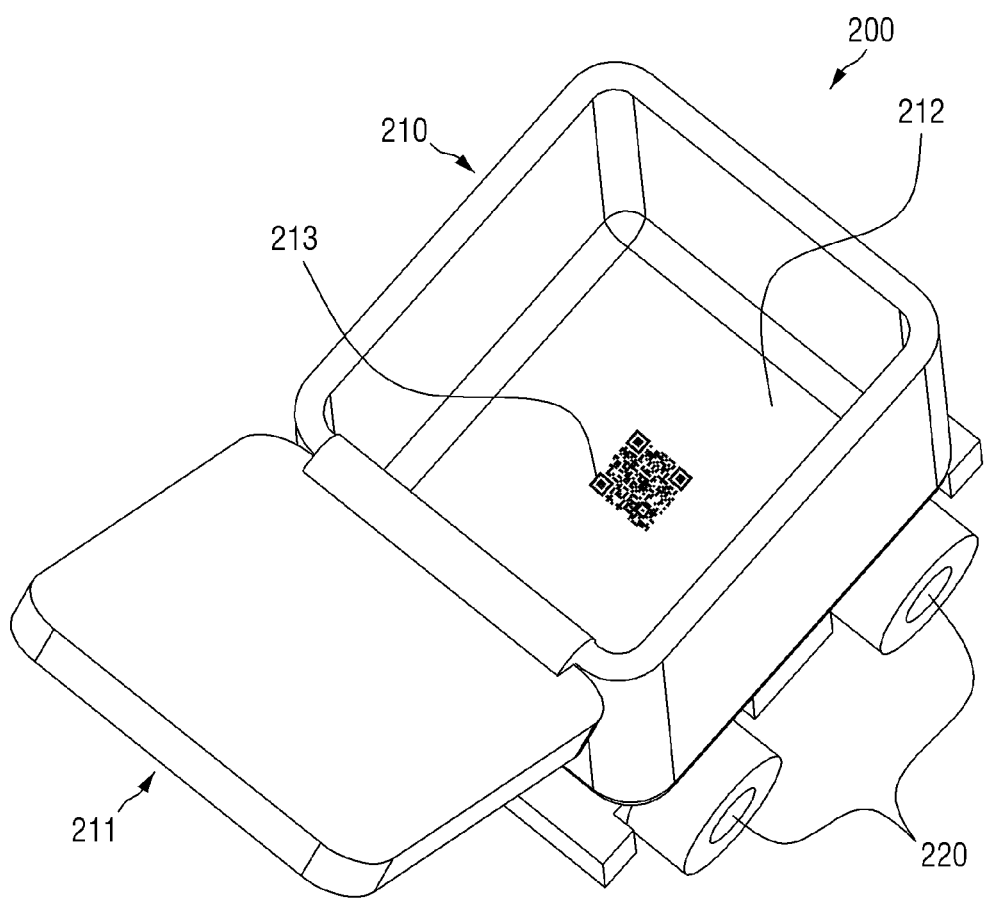
FIG. 14 is a diagram exemplifying a marker displayed in an autonomous vehicle.

Next, the unmanned aerial vehicle 100 captures an image of the autonomous vehicle 200 using the camera 120 (S111-2). Next, the unmanned aerial vehicle 100 may analyze the captured image to determine whether the marker is recognized (S111-3). The marker may be a two-dimensional barcode as a promised image. In addition, as illustrated in FIG. 14, the marker may be located in the center of the bottom surface of the goods storage box 210.

The unmanned aerial vehicle 100 may adjust its position if the marker is not recognized (S111-4). At this time, the unmanned aerial vehicle 100 may move in the horizontal direction of forward/backward/left/right by a predetermined distance, or may adjust its position by vertically ascending the altitude by a predetermined height. When the movement is completed, the unmanned aerial vehicle 100 captures an image of the autonomous vehicle 200 again using the camera 120.

On the other hand, when the marker is recognized in the captured image, the unmanned aerial vehicle 100 identifies the region occupied by the marker on the entire captured image (S111-5). Then, the unmanned aerial vehicle 100 calculates a distance between the center coordinates of the identified occupied region and the center coordinates of the image (S111-6).

Then, the unmanned aerial vehicle 100 determines whether the calculated distance is less than or equal to a preset threshold distance (S111-7). When the calculated distance exceeds the threshold distance, the relative position with the autonomous vehicle 200 may be adjusted by moving horizontally towards the center coordinate of the occupied region (S111-8). In addition, the unmanned aerial vehicle 100 may capture an image of the autonomous vehicle 200 again at the moved position.

On the other hand, if the calculated distance is less than or equal to the threshold distance, the unmanned aerial vehicle 100 may determine that the position adjustment is completed, and perform flight in place (i.e., hovering) (S111-9). As another embodiment, the unmanned aerial vehicle 100 may perform flight in place after vertically ascending or descending the altitude so that the height separated between the unmanned aerial vehicle 100 and the autonomous vehicle 200 is within a preset range. That is, in the state in which the calculated distance is less than or equal to the threshold distance, the unmanned aerial vehicle 100 may perform flight in place immediately if the current height from the autonomous vehicle 200 is in the preset separation range, otherwise, it may perform flight in place after vertically ascending or descending the altitude so that the height becomes in the separation range. The separation range may be set based on the length of the wires 114a and 114b. In an embodiment, the unmanned aerial vehicle 100 may measure a height separated from the autonomous vehicle 200 by using a distance measuring sensor (not shown in the figure).

In the above description, although an embodiment of adjusting the relative position of the unmanned aerial vehicle 100 based on the distance between the center coordinates of the region occupied by the marker in the image captured by the unmanned aerial vehicle 100 and the center coordinates of the image is described, the present disclosure is not limited to the embodiment. For example, the relative position of the unmanned aerial vehicle 100 may be adjusted so that the marker is located at a predetermined specific position, such as an arbitrary edge or vertex in the captured image.

Figure 10:
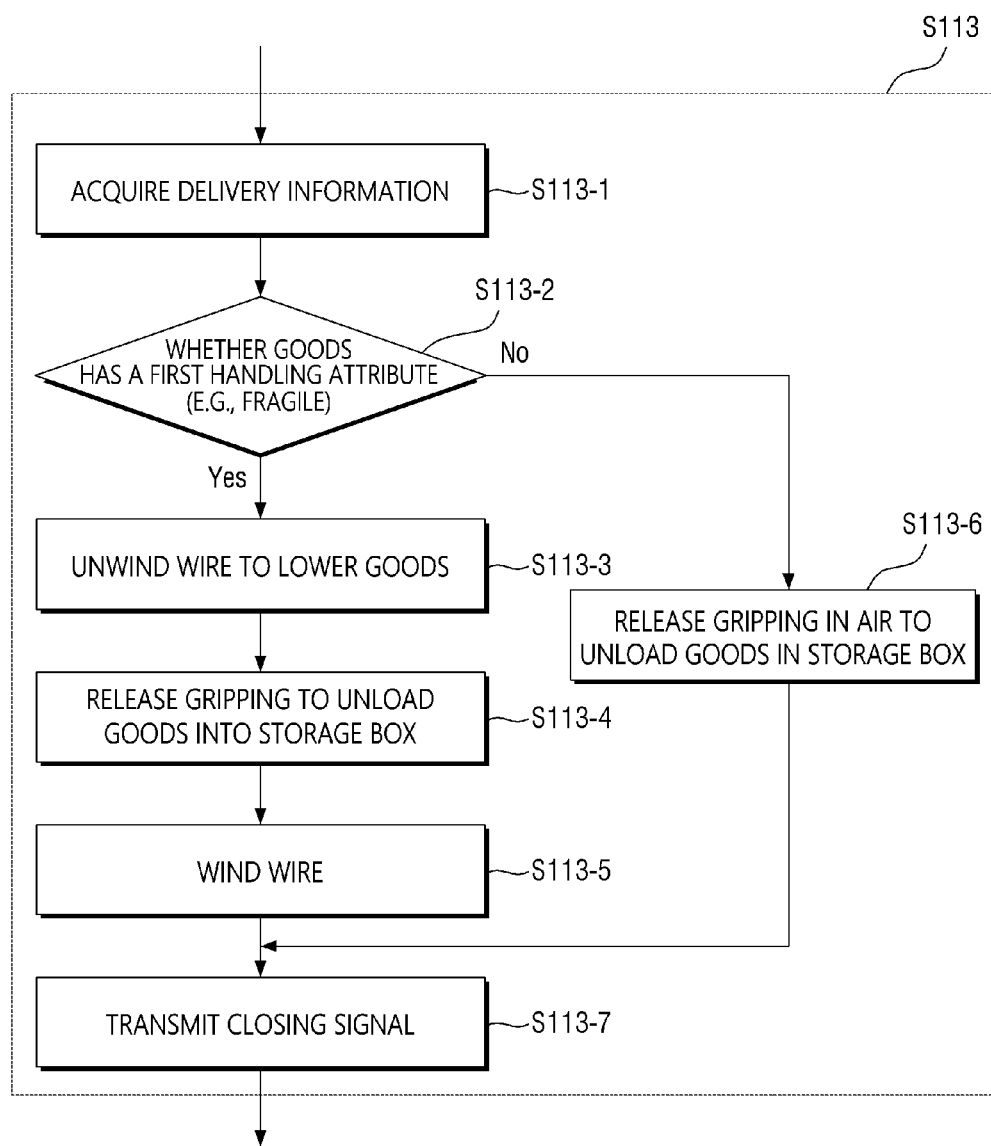
FIG. 10 is a flowchart for describing in more detail some operations of the goods handling method, which may be understood with reference to FIG. 8.

Hereinafter, with reference to FIG. 10, a method of unloading the goods 10 (S113) will be described in more detail.

The unmanned aerial vehicle 100 may acquire the stored delivery information (S113-1), and determine whether the handling attribute of the goods 10 to be unloaded corresponds to the first attribute based on the data included in the delivery information (S113-2). Here, the first attribute may be a handling attribute indicating fragile.

Next, in response to the determination that the handling attribute of the article 10 is the first attribute, the unmanned aerial vehicle 100 unwinds the wires 114a and 114b connected to the gripping members 112 and 113 gripping the goods 10 so that the goods 10 is lowered into the goods storage box 210 of the autonomous vehicle 200 (S113-3). Subsequently, when the lowering of the goods is completed, the unmanned aerial vehicle 100 may release the gripping state of the pressing members 112a and 113a formed on the inner surfaces of the gripping members 112 and 113 to unload the goods 10 into the goods storage box 210 (S113-4). The pressing members 112a and 113a may move to the outer surface to release the gripping state of the goods 10. Next, when the unloading of the goods 10 is completed, the wires 114a and 114b may be wound (S113-5).

On the other hand, in response to the determination that the handling attribute of the goods 10 to be unloaded is the second attribute, the unmanned aerial vehicle 100 may release the gripping state of the goods 10 in the air to unload the goods 100 into the goods storage box 210 (S113-6). Here, the second attribute may be an attribute of goods that does not correspond to fragile. In other words, when the handling attribute of the goods 10 is the second attribute, the unmanned aerial vehicle 100 releases the gripping state of the pressing members 112a and 113a formed on the inner surfaces of the gripping members 112 and 113 in the air, so that the goods 10 can be quickly unloaded into the goods storage box 210.

Next, when unloading is normally completed, the unmanned aerial vehicle 100 may transmit a closing signal for closing the lid of the goods storage box 210 to the autonomous vehicle 200 (S113-7), and the autonomous vehicle 200 may close the open lid according to the closing signal. In addition, the autonomous vehicle 200 may autonomously move to a delivery destination to deliver unloaded goods.

According to the present embodiment, the positions of the autonomous vehicle 200 having the goods storage box 210 and the unmanned aerial vehicle 100 are adjusted so that the goods 10 can be accurately unloaded at a designated position, thereby yielding an effect of improving stability and reliability for unloading goods. In addition, according to this embodiment, there is also an advantage that the flight positioning of the unmanned aerial vehicle 100 is quickly controlled based on the distance that the center coordinates of the marker occupied region are separated from the image center coordinates. In addition, according to the present embodiment, if it is not fragile goods, unloading is quickly performed in the air, and if it is fragile goods, unloading is safely performed, so that the speed and stability of the unloading can be exhibited at the same time.

Figure 11:
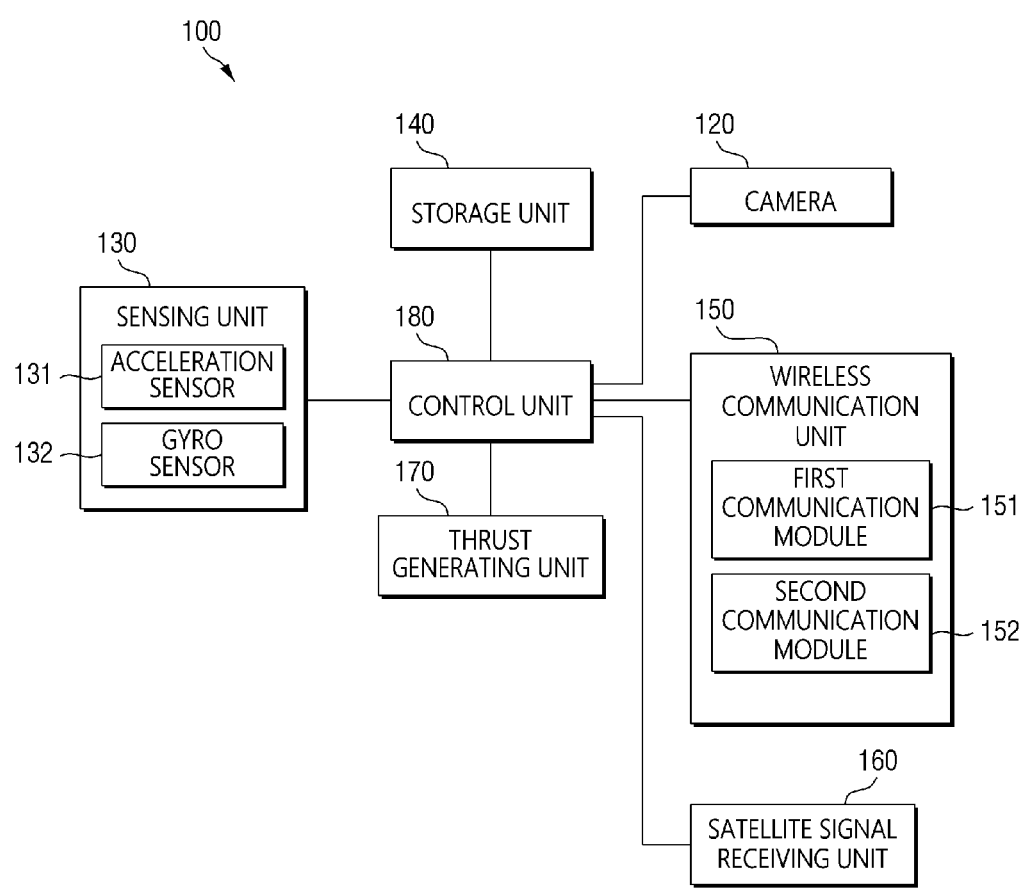
FIG. 11 is a block diagram of an unmanned aerial vehicle according to another embodiment of the present disclosure.

FIG. 11 is a block diagram of an unmanned aerial vehicle according to another embodiment of the present disclosure.

As shown in FIG. 11, the unmanned aerial vehicle 100 according to an embodiment of the present disclosure comprises a sensing unit 130, a storage unit 140, a camera 12, a wireless communication unit 150, a satellite signal receiving unit 160, a thrust generating unit 170 and the control unit 180, and these components may be implemented as hardware or software, or may be implemented through a combination of hardware and software.

The wireless communication unit 150 may perform wireless communication with each of the autonomous vehicle 200 and the control server 400. The wireless communication unit 150 may comprise a first communication module 151 and a second communication module 152 that perform wireless communication based on different protocols.

The first communication module 151 may communicate with the control server 400 and the like using a mobile communication network included in the network 300.

The second communication module 152 may perform wireless communication with the autonomous vehicle 200 using short-range wireless communication. As the short-range wireless communication, protocols such as Wi-Fi, Zigbee and Bluetooth may be used.

The camera 120 may capture an image of the autonomous vehicle 200 having the goods storage box 210.

The satellite signal receiving unit 160 may receive a plurality of satellite signals (aka, GPS signals) used for position measurement based on a global navigation satellite system (GNSS).

The thrust generating unit 170 may generate thrust in the unmanned aerial vehicle 100 by driving one or more propellers 111-n provided in the unmanned aerial vehicle. The thrust generating unit 170 may drive the propellers 111-n or control the rotation speed based on the control signal received from the control unit 180. The thrust generating unit 170 may control the propeller rotation speed differently for each propeller, or may control the propelling direction of the propeller to control the moving direction of the unmanned aerial vehicle.

The storage unit 140 is a storage means such as a memory, and stores various data necessary for the operation of the unmanned aerial vehicle. The storage unit 140 may store delivery information including an unloading place, delivery destination information, and information on whether the goods 10 corresponds to fragile. The storage unit 140 may store planned route information. The planned route information may include a plurality of GNSS coordinates that should be sequentially passed from a departure place to an unloading place.

The sensing unit 130 may include an acceleration sensor 131 and a gyro sensor 132. The sensing unit 130 may measure a yaw, a pitch, and a roll of the unmanned aerial vehicle through the gyro sensor 131 and the acceleration sensor 131. In addition, the sensing unit 130 may respectively measure the X-axis acceleration, the Y-axis acceleration, and the Z-axis acceleration of the unmanned aerial vehicle 100 by using the gyro sensor 131 and the acceleration sensor 131. Also, the sensing unit 130 may further include other sensors (not shown in the figures) such as a barometer, an ultrasonic sensor, and a distance measuring sensor. The sensing unit 130 may also measure the current speed of the unmanned aerial vehicle 100 by using one or more of a plurality of satellite signals received by the satellite signal receiving unit 160 and sensing data measured by the other sensors.

The control unit 180 is a control means such as a microprocessor, and may control various components included in the unmanned aerial vehicle 100. The control unit 180 may continuously acquire posture information including roll, yaw, and pitch of the unmanned aerial vehicle through the sensing unit 130. The control unit 180 may identify the posture of the unmanned aerial vehicle through the sensing unit 130 and control the thrust generating unit 170 so that the posture of the unmanned aerial vehicle may be stably maintained. The control unit 180 may control the thrust generating unit 170 so that the unmanned aerial vehicle can autonomously fly to a target point (e.g., an unloading place) through the planned route based on the planned route information.

In an embodiment, the control unit 180 may analyze an image captured by the camera 120 to recognize a marker displayed in the goods storage box 210, and may control the thrust generating unit 170 based on the recognition state of the marker so that the relative position of the autonomous driving moving object 200 and the unmanned aerial vehicle is adjusted. The marker may be a two-dimensional barcode. When the position adjustment is completed, the control unit 180 may release the gripping state of the gripping members 112 and 113 to unload the goods 10 into the goods storage box 210. The control unit 180 may calculate the distance between the center coordinates of the region occupied by the marker in the captured image and the center coordinates of the image, and determine that the position adjustment is completed when the calculated distance is within a threshold distance. On the other hand, when the calculated distance exceeds the threshold distance, the control unit 180 may control the thrust generating unit 170 to move the unmanned aerial vehicle 100 in the center coordinate direction of the region occupied by the marker.

On the other hand, when the second communication module 152 forms a short-range wireless session with the autonomous vehicle 200, the control unit 180 may transmit an open signal for opening the lid of the goods storage box 210 to the autonomous vehicle 200 through the second communication module 152. Accordingly, the camera 120 may capture the marker displayed in the inside of the goods storage box 210.

In addition, the control unit 180 identifies whether the goods correspond to fragile goods based on the delivery information being stored in the storage unit 140, and if the goods do not correspond to fragile goods, it may control the gripping members 112 and 113 to release the gripping state of the goods in the air to unload the goods into the goods storage box. When the goods correspond to fragile goods, the control unit 180 may unwind the wires 114a and 114b connected to the gripping members 112 and 113 gripping the goods to lower the goods to the inside of the goods storage box 210 of the autonomous vehicle 200, and then release the gripping state of the pressing members 112a and 113a formed on the inner surfaces of the gripping members 112 and 113 to unload the goods into the goods storage box 210.

The configuration and operation of the autonomous vehicle 200 applied to the delivery system will be described.

Figure 12:
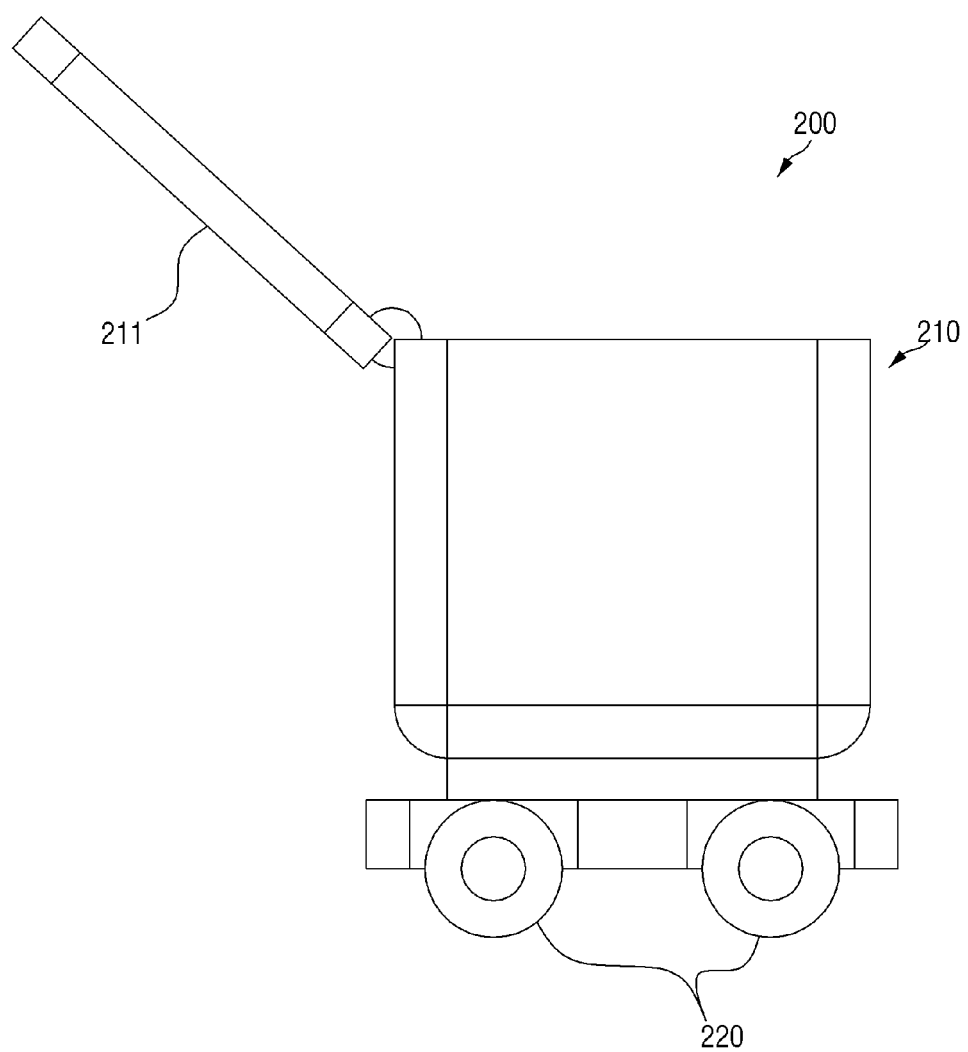
FIG. 12 is a side view of an autonomous vehicle with a lid open.

FIG. 12 is a side view of an autonomous vehicle with an open lid.

Figure 13:
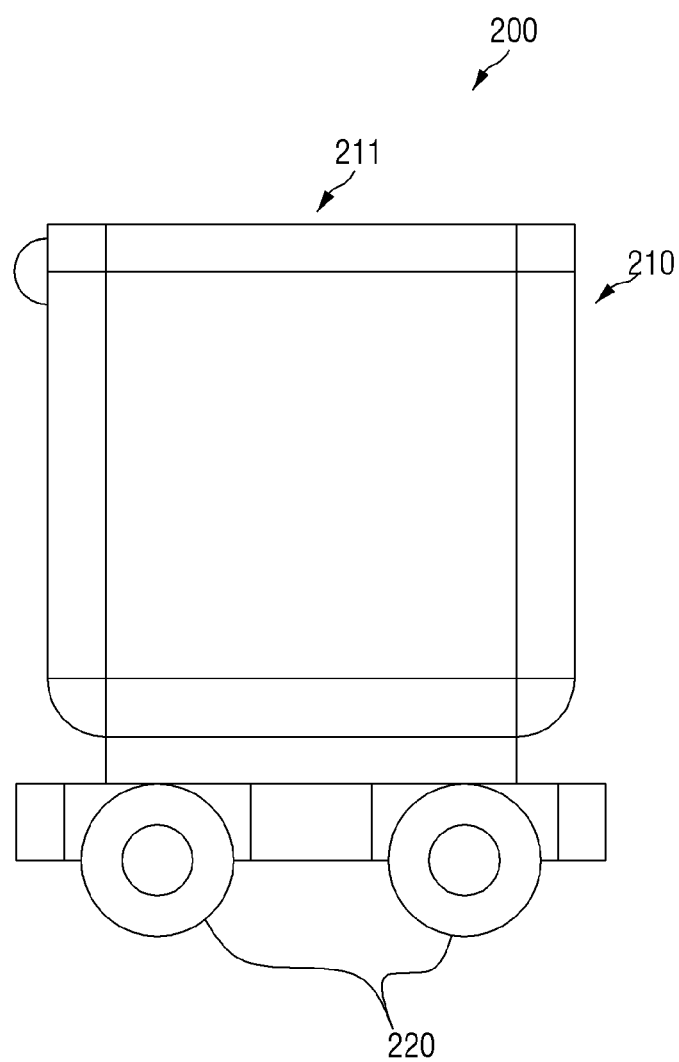
FIG. 13 is a side view of an autonomous vehicle with a lid closed.

FIG. 13 is a side view of an autonomous vehicle with a closed lid.

FIG. 14 is a diagram exemplifying a marker displayed in an autonomous vehicle.

Referring to FIGS. 12 to 14, the autonomous vehicle 200 includes a goods storage box 210 capable of storing the goods 10 therein. In addition, the autonomous vehicle 200 may include a driving means 220 such as a wheel capable of driving on a road, and a battery (not shown) that provides power to the driving means 220.

The lid 211 included in the goods storage box 210 can be opened and closed, and a marker 213 is displayed on the bottom surface 212. The marker 213 may be a two-dimensional barcode. Also, the marker 213 may be located at the center of the bottom surface 212. The lid 211 of the goods storage box 210 may be opened or closed according to the control of the autonomous vehicle 200.

When the goods 10 are unloaded into the goods storage box 210, the autonomous vehicle 200 may autonomously drive to a designated delivery destination to deliver the goods.

Figure 15:
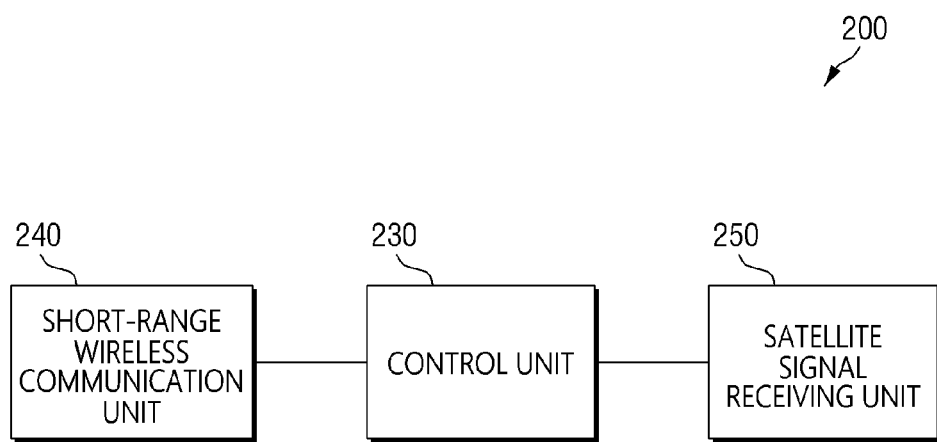
FIG. 15 is a block diagram of an autonomous vehicle according to another embodiment of the present disclosure.

FIG. 15 is a block diagram of an autonomous vehicle according to another embodiment of the present disclosure.

As shown in FIG. 15, an autonomous vehicle 200 according to another embodiment of the present disclosure may include a short-range wireless communication unit 240, a satellite signal receiving unit 250, and a control unit 230. The components may be implemented in hardware or software, or may be implemented through a combination of hardware and software.

The short-range wireless communication unit 240 may perform wireless communication with the unmanned aerial vehicle 100 using short-range wireless communication. As the short-range wireless communication, protocols such as Wi-Fi, Zigbee, and Bluetooth may be used.

The satellite signal receiving unit 250 may receive a plurality of satellite signals used for GNSS-based position measurement.

The control unit 230 is a control means such as a microprocessor, and may control various components included in the autonomous vehicle 200. The control unit 180 may control the driving means 220 so that the autonomous vehicle can move to the delivery destination. The control unit 180 may receive delivery destination information from the unmanned aerial vehicle 100 through the short-range wireless communication unit 240, analyze the satellite signal received through the satellite signal receiving unit 250 to measure the current position, and control the driving means 220 based on the measured current location and delivery destination information so that the autonomous vehicle 200 autonomously drives to the delivery destination. In one embodiment, when the short-range wireless communication unit 240 forms a short-range wireless session with the unmanned aerial vehicle 100, the control unit 230 opens the lid 211 of the goods storage box 210 to expose the marker 213 to the outside. When receiving an open signal from the unmanned aerial vehicle 100, the control unit 180 may open the lid 211. In addition, when the goods 10 are unloaded into the goods storage box 210 by the unmanned aerial vehicle 100 recognizing the marker 213, the control unit 230 may control the driving means 220 to autonomously drive to a designated delivery destination after the lid 211 is closed. In this case, when receiving a closing signal from the unmanned aerial vehicle 100, the control unit 180 may close the lid 211.

According to this embodiment, the autonomous vehicle 200 can safely take over goods from the unmanned aerial vehicle 100 and deliver them to a delivery destination.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

In the above description, it is described that all the components constituting the embodiments of the present disclosure are combined or operated as one, but the technical features of the present disclosure are not limited to these embodiments. That is, within the scope of the present disclosure, all of the components may be selectively combined and operated in one or more combinations.

Although the operations are shown in a specific order in the drawings, those skilled in the art will appreciate that many variations and modifications can be made to the embodiments without substantially departing from the principles of the present disclosure. Therefore, the disclosed preferred embodiments of the disclosure are used in a generic and descriptive sense only and not for purposes of limitation. The scope of protection of the present disclosure should be interpreted by the following claims, and all technical ideas within the scope equivalent thereto should be construed as being included in the scope of the technical idea defined by the present disclosure.

What is claimed is:

1. A method for an unmanned aerial vehicle to handle goods in cooperation with an autonomous vehicle comprising:
   capturing, by the unmanned aerial vehicle, an image of the autonomous vehicle having a storage box for storing goods, a marker being displayed at the storage box;
   identifying, by the unmanned aerial vehicle, a region occupied by the marker on the captured image;
   adjusting by the unmanned aerial vehicle, a relative position with the autonomous vehicle based on a distance between center coordinates of the identified region and center coordinates of the captured image, and
   by the unmanned aerial vehicle, in response to the adjustment of the relative position is completed, unloading the goods into the storage box,
   wherein the adjusting the relative position with the autonomous vehicle comprises:
   by the unmanned aerial vehicle, determining whether the distance exceeds a preset threshold;
   by the unmanned aerial vehicle, in response to the distance exceeding the threshold, adjusting the relative position with the autonomous vehicle by moving horizontally towards the center coordinate of the identified region; and
   by the unmanned aerial vehicle, in response to the distance not exceeding the threshold, completing the adjustment of the relative position adjustment with the autonomous vehicle.

2. The method of claim 1, wherein capturing the image comprises,
   establishing, by the unmanned aerial vehicle, a short-range wireless session with the autonomous vehicle;
   transmitting, by the unmanned aerial vehicle, a first signal for opening the lid of the storage box to the autonomous vehicle through the short-range wireless session; and
   capturing, by the unmanned aerial vehicle, an image of the autonomous vehicle, wherein the lid of the storage box is opened to expose the marker in response to the first signal.

3. The method of claim 1, wherein the marker is located at a center of a bottom surface of the storage box.

4. The method of claim 1, wherein the marker is a two-dimensional barcode.

5. An unmanned aerial vehicle comprising:
   a thrust generator for generating a thrust to move an unmanned aerial vehicle to an autonomous vehicle having a storage box for storing goods, a marker being displayed at the storage box;
   a camera for capturing an image of the autonomous vehicle; and
   a controller for identifying a region occupied by the marker on the captured image, controlling the thrust generator to adjust a relative position with the autonomous vehicle based on a distance between center coordinates of the identified region and center coordinates of the captured image, and in response to the adjustment of the relative position is completed, unloading the goods into the storage box,
   wherein the controller controls the thrust generator:
   to determine whether the distance exceeds a preset threshold;
   in response to the distance exceeding the threshold, to adjust the relative position with the autonomous vehicle by moving horizontally towards the center coordinate of the identified region; and
   in response to the distance not exceeding the threshold, to complete the adjustment of the relative position adjustment with the autonomous vehicle.

6. The unmanned aerial vehicle of claim 5 further comprises,
   a wireless communicator for establishing a short-range wireless session with the autonomous vehicle,
   wherein the controller transmits a first signal for opening a lid of the goods storage box to the autonomous vehicle that establishes the short-range wireless session, and
   wherein the camera captures an image of the autonomous vehicle, wherein the lid of the goods storage box is opened to expose the marker in response to the first signal.

* * * * *